(12) United States Patent
Ned et al.

(10) Patent No.: US 12,436,054 B2
(45) Date of Patent: Oct. 7, 2025

(54) WATERPROOF PRESSURE SENSING DEVICE WITH IMPROVED RELIABILITY AND PERFORMANCE

(71) Applicant: KULITE SEMICONDUCTOR PRODUCTS, INC., Leonia, NJ (US)

(72) Inventors: Alexander A. Ned, Kinnelon, NJ (US); Scott Goodman, Wayne, NJ (US); Andrew Bemis, Upper Saddle River, NJ (US)

(73) Assignee: KULITE SEMICONDUCTOR PRODUCTS, INC., Leonia, NJ (US)

( * ) Notice: Subject to any disclaimer, the term of this patent is extended or adjusted under 35 U.S.C. 154(b) by 376 days.

(21) Appl. No.: 18/300,490

(22) Filed: Apr. 14, 2023

(65) Prior Publication Data
US 2024/0344912 A1 Oct. 17, 2024

(51) Int. Cl.
*G01L 9/06* (2006.01)
*G01L 19/06* (2006.01)

(52) U.S. Cl.
CPC ........... *G01L 19/0645* (2013.01); *G01L 9/06* (2013.01)

(58) Field of Classification Search
CPC . G01L 19/147; G01L 9/0072; G01L 19/0645; G01L 19/0084; G01L 13/025; G01L 19/0007; G01L 9/0042; G01L 19/0038; G01L 9/0073; G01L 9/0075; G01L 9/0054; G01L 9/0055; G01L 19/04; G01L 7/00; G01L 7/04; G01L 19/148; G01L 19/14; G01L 19/143; G01L 17/00; G01L 7/18; G01L 19/0092; G01L 15/00; G01L 9/0051; G01L 7/041; G01L 9/12; G01L 9/065; G01L 19/0618; G01L 9/0052; G01L 9/125; G01L 7/16; G01L 19/0609; G01L 19/003; G01L 9/007; G01L 19/0627; G01L 19/0046; G01L 9/0022; G01L 9/06;
(Continued)

(56) References Cited

U.S. PATENT DOCUMENTS 3,863,192 A * 1/1975 Grey ................. G01L 1/2287
338/2
5,614,678 A * 3/1997 Kurtz ................ G01L 9/0055
338/42
(Continued)

FOREIGN PATENT DOCUMENTS

CN 114705346 A * 7/2022 ............. G01L 9/08
CN 117998778 A * 5/2024 ............. H05K 7/20
(Continued)

*Primary Examiner* — Andre J Allen
(74) *Attorney, Agent, or Firm* — TROUTMAN PEPPER LOCKE LLP; James E. Schutz; Mark Lehi Jones

(57) ABSTRACT

A pressure transducer assembly configured for low-pressure measurements in water or high humidity environments, the pressure transducer assembly having a non-corrosive housing, an upside-down mounted pressure sensor chip comprising silicon and contact glass, and an electrically insulating and stress-absorbing spacer layer disposed between the non-corrosive housing and the contact glass of the sensor chip, the spacer layer is matched to a coefficient of thermal expansion (CTE) of one or more of the glass and the silicon of the sensor chip to absorb stress and improve reliability. The pressure transducer assembly may be suitable for use in microphone and/or hydrophone applications.

20 Claims, 5 Drawing Sheets

(58) Field of Classification Search
CPC ..... G01L 19/0636; G01L 7/084; G01L 13/02; G01L 19/0023; G01L 19/142; G01L 7/043; G01L 19/08; G01L 9/0002; G01L 19/02; G01L 9/008; G01L 19/141; G01L 9/006; G01L 11/02; G01L 19/0672; G01L 23/10; G01L 23/18; G01L 19/0681; G01L 9/0077; G01L 19/12; G01L 27/005; G01L 7/082; G01L 9/0044; G01L 19/0015; G01L 19/0069; G01L 7/063; G01L 9/0001; G01L 19/146; G01L 21/12; G01L 27/002; G01L 27/007; G01L 9/16; G01L 11/00; G01L 19/00; G01L 9/0026; G01L 9/0089; G01L 9/045; G01L 9/14; G01L 19/0654; G01L 1/2281; G01L 11/025; G01L 13/026; G01L 11/008; G01L 7/22; G01L 13/00; G01L 9/0047; G01L 7/08; G01L 9/0076; G01L 9/0025; G01L 9/0035; G01L 19/0061; G01L 9/0005; G01L 9/0041; G01L 9/0019; G01L 9/08; G01L 9/10; G01L 21/00; G01L 9/04; G01L 11/006; G01L 19/086; G01L 9/00; G01L 9/0008; G01L 1/18; G01L 11/004; G01L 19/069; G01L 9/0057; G01L 19/083; G01L 19/06; G01L 19/10; G01L 19/16; G01L 9/0016; G01L 13/023; G01L 7/048; G01L 9/0048; G01L 9/0027; G01L 9/0086; G01L 9/0079; G01L 11/04; G01L 1/20; G01L 9/0091; G01L 27/00; G01L 11/002; G01L 23/24; G01L 7/182; G01L 1/02; G01L 19/0663; G01L 7/166; G01L 23/22; G01L 9/0036; G01L 9/0061; G01L 9/0039; G01L 23/125; G01L 19/145; G01L 9/0013; G01L 21/04; G01L 9/0045; G01L 9/0092; G01L 1/142; G01L 7/104; G01L 9/0033; G01L 9/0083; G01L 9/0098; G01L 1/2293; G01L 7/24; G01L 9/02; G01L 21/22; G01L 9/0029; G01L 7/022; G01L 1/205; G01L 9/0064; G01L 23/08; G01L 5/14; G01L 13/06; G01L 23/16; G01L 7/088; G01L 7/163; G01L 9/0007; G01L 23/222; G01L 1/16; G01L 1/2287; G01L 9/0085; G01L 9/025; G01L 1/2212; G01L 21/14; G01L 9/0004; G01L 23/02; G01L 9/003; G01L 9/085; G01L 1/14; G01L 1/148; G01L 9/0058; G01L 9/105; G01L 7/02; G01L 7/061; G01L 9/002; G01L 1/2231; G01L 13/028; G01L 9/0095; G01L 23/28; G01L 1/162; G01L 19/076; G01L 7/12; G01L 9/0038; G01L 9/0032; G01L 21/10; G01L 7/024; G01L 19/149; G01L 1/246; G01L 7/086; G01L 1/005; G01L 5/228; G01L 7/06; G01L 1/2206; G01L 7/102; G01L 13/021; G01L 27/02; G01L 1/2262; G01L 1/24; G01L 1/26; G01L 23/00; G01L 9/0094; G01L 19/144; G01L 9/0082; G01L 1/125; G01L 9/0097; G01L 1/2268; G01L 11/06; G01L 21/30; G01L 21/34; G01L 23/221; G01L 7/187; G01L 7/20; G01L 1/146; G01L 23/26; G01L 7/068; G01L 1/144; G01L 1/225; G01L 23/32; G01L 7/14; G01L 1/165; G01L 23/12; G01L 1/241; G01L 13/04; G01L 7/045; G01L 1/086; G01L 1/22; G01L 7/108; G01L 9/18; G01L 1/127; G01L 17/005; G01L 5/18; G01L 1/245; G01L 21/32; G01L 1/183; G01L 1/2218; G01L 9/0023; G01L 1/243; G01L 23/145; G01L 5/0047; G01L 5/0076; G01L 9/0088; G01L 1/106; G01L 1/10; G01L 9/001; G01L 1/186; G01L 23/223; G01L 25/00; G01L 5/165; G01L 5/226; G01L 9/0017; G01L 1/044; G01L 3/245; G01L 9/005; G01L 1/08; G01L 21/16; G01L 3/1485; G01L 5/0038; G01L 5/162; G01L 5/225; G01L 7/026; G01L 7/065; G01L 9/0014; G01L 1/04; G01L 1/242; G01L 21/24; G01L 3/10; G01L 5/0004; G01L 5/0052; G01L 5/24; G01L 7/10; G01L 1/00; G01L 1/103; G01L 1/2275; G01L 1/247; G01L 21/02; G01L 21/26; G01L 23/225; G01L 3/102; G01L 3/105; G01L 5/223; G01L 7/028; G01L 9/0011; G01L 5/00; G01L 5/0028; G01L 5/243; G01L 1/083; G01L 1/12; G01L 21/36; G01L 23/04; G01L 23/14; G01L 23/30; G01L 3/103; G01L 5/0033; G01L 5/102; G01L 5/133; G01L 5/1627; G01L 5/166; G01L 7/185; G01L 1/255; G01L 21/08; G01L 5/0057; G01L 5/22; G01L 1/042; G01L 1/122; G01L 1/2225; G01L 1/2243; G01L 1/2256; G01L 1/248; G01L 2009/0067; G01L 2009/0069; G01L 21/06; G01L 23/06; G01L 3/00; G01L 3/06; G01L 3/1478; G01L 3/1492; G01L 3/18; G01L 3/24; G01L 3/242; G01L 5/0061; G01L 5/08; G01L 5/10; G01L 5/101; G01L 5/108; G01L 5/16; G01L 5/161; G01L 5/167; G01L 5/28; G01L 1/046; G01L 2009/0066; G01L 2019/0053; G01L 23/085; G01L 23/20; G01L 5/0071; G01L 5/008; G01L 5/06; G01L 5/171; G01L 7/106

USPC .................................................. 73/700–756
See application file for complete search history.

(56) References Cited

U.S. PATENT DOCUMENTS

| | | | | |
|---|---|---|---|---|
| 5,955,771 | A * | 9/1999 | Kurtz | G01L 19/0084 257/710 |
| 7,847,387 | B2 * | 12/2010 | Kilger | B81B 7/007 257/E23.128 |
| 10,132,706 | B2 * | 11/2018 | Perkins | G01L 19/0672 |
| 10,436,662 | B2 * | 10/2019 | Ned | G01L 9/0044 |
| 10,640,367 | B2 * | 5/2020 | Vummidi Murali | B81B 7/0029 |
| 2024/0003770 | A1 * | 1/2024 | Do | H05K 1/181 |

FOREIGN PATENT DOCUMENTS

| | | | | |
|---|---|---|---|---|
| DE | 102023209464 A1 * | 3/2025 | | G01L 19/14 |
| WO | WO-2021109303 A1 * | 6/2021 | | G01L 9/08 |

* cited by examiner

WATERPROOF PRESSURE SENSING DEVICE WITH IMPROVED RELIABILITY AND PERFORMANCE

TECHNICAL FIELD

The disclosed technology relates to a pressure-sensing device including electronic device packaging suitable for submersion in water or for use in high humidity environments, and in particular, to package construction and materials for improving reliability and reducing thermal expansion mismatches within the device.

BACKGROUND

Microphones are typically used for converting pressure fluctuations (in air or fluid) to electrical signals that can be recorded or amplified. A water-submersible microphone, also known as an underwater microphone or hydrophone, is designed to be used in water environments and can pick up sounds underwater. These microphones can be very expensive since they are engineered and built with materials that can withstand being submerged in water. On the other hand, a regular audio microphone is typically not designed for use in such environments, and its components can be corroded and damaged when exposed to water or high humidity.

The diaphragm/transducer of the microphone is the main component that moves in response to pressure waves. For sensitivity at low frequencies, for example in the human lower audible range of 100's cycles per second (Hz), the diaphragm of the microphone needs to be relatively large to move in response to the low-frequency pressure fluctuations, which can require careful material selection and sealing techniques to avoid corrosion.

Various approaches have been proposed for packaging piezoresistive pressure sensors for extreme environments, and to provide electrical interconnections from the transducer to external leads. The leadless sensor approach, for example, may be appropriate in certain sensing applications but the header in previous designs can corrode and there is a limit to how large the diaphragm can be due to limitations caused by the associate pins. It would also be beneficial to utilize flexible wire bonding technology for certain interconnections, particularly for large diaphragm microphone applications where rigid connections can impart stress on the diaphragm or fail. However, wire bonding technology has long been considered inadequate for corrosive high humidity use due to reliability issues.

A need exists for systems and methods in which a transducer chip can be mechanically secured within and thermally matched to a housing and electrically connected with interconnections for reliable operation in high-humidity or corrosive environments.

BRIEF SUMMARY

Certain example implementations of the disclosed technology may include systems and methods for packaging sensors for reliable operation in high-humidity environments. In one example implementation, a pressure sensor device is provided that includes a non-corrosive housing, a sensor chip comprising silicon and contact glass, the sensor chip configured for low-pressure measurements, an electrically insulating and stress-absorbing spacer layer disposed between the non-corrosive housing and the contact glass of the sensor chip, at least two electrical feedthrough pins, and electrical interconnections disposed between the sensor chip and the electrical feedthrough pins. In certain exemplary implementations, a back end of the pressure sensor device is hermetically sealed so that only a backside of the sensor chip, the spacer layer, and the housing is exposed to pressure media during use.

In another example implementation, a method is provided for assembling a pressure sensor device. The method includes forming a non-corrosive housing, the housing comprising a header shell, a lip rim, and a bottom having electrically insulated pin-feedthrough openings, mounting an electrically insulating and stress-absorbing spacer to the lip rim, mounting a pressure sensing chip comprising a silicon sensor on insulator (SOI) to the spacer so that the insulator portion of the pressure sensing chip is against the spacer, installing electrical feedthrough pins in the pin-feedthrough openings; forming electrical wire interconnections between the sensor chip and the electrical feedthrough pins; and scaling the pressure sensor device so that only the pressure sensing chip, the spacer, and the housing is exposed to pressure media during use.

Other implementations, features, and aspects of the disclosed technology are described in detail herein and are considered a part of the claimed disclosed technology. Other implementations, features, and aspects can be understood with reference to the following detailed description, accompanying drawings, and claims.

DETAILED DESCRIPTION

Some of the most challenging aspects associated with producing highly sensitive and reliable microphones and/or other pressure sensors suitable for use in high-humidity environments or submersion in water include (1) providing a large diaphragm; (2) using water/corrosion-resistant packaging for housing the sensing element; and (3) selecting materials for reducing thermal expansion mismatches between the sensing element and the housing. Certain example implementations of the disclosed technology include devices and techniques for addressing such challenges by providing electronic device packaging, sealing techniques, materials for thermal matching, and interconnections suitable for high humidity operability.

The terms "interconnection," "interconnect," "connection," "junction," etc., as used herein, may refer to a physical and/or electrical connection between or among two or more components and/or materials, including but not limited to conductors, semiconductors, insulators, contact pads, wires, leads, barrier layers, oxides, etc.

Certain exemplary implementations of the disclosed technology may build on and improve certain sensor packaging technologies and interconnection techniques designed for extreme environments, such as described in U.S. Pat. Nos. 5,955,771 and 5,614,678 to Kurtz, et al., and U.S. Pat. No. 10,436,662 to Ned, et al., each of which is assigned to Kulite Semiconductor Products, Inc., and are incorporated herein by reference as if presented in full.

The disclosed technology includes certain improved pressure sensor package designs and materials for enhanced reliability and/or performance in high-humidity or water-submersible applications. Certain exemplary implementations of the disclosed technology can provide a water- and/or corrosion-resistant sealed environment for portions of the sensing element, the wire bonded interconnects, and/or the associated contact pads that may otherwise corrode if exposed.

The example embodiments disclosed herein can further solve the problem of internal stresses caused by thermal expansion mismatches between the various assembly components. For example, as will be discussed below with reference to the figures, the disclosed technology may utilize a specific "upside down" sensor chip attached to the housing via a spacer having a material that is thermally matched to the sensor chip. Accordingly, the disclosed technology provides certain improved pressure sensor package designs and materials for specific measurements in various applications, including, but not limited to high humidity environments, corrosive environments, and/or various microphone applications.

Figure 1:
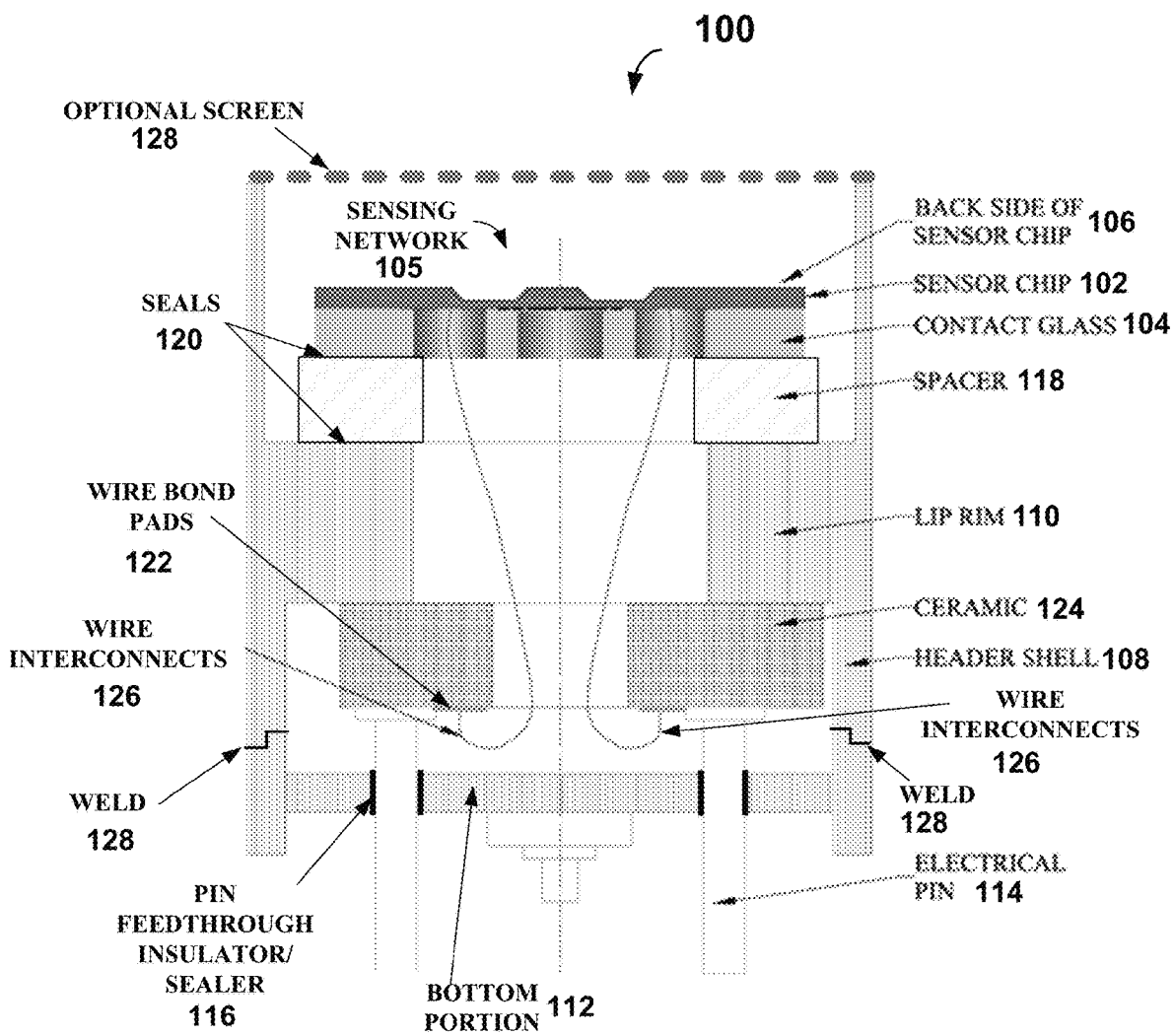
FIG. 1 depicts an example cross-sectional side-view layout of a pressure sensor device, according to an example implementation of the disclosed technology.

FIG. 1 depicts an example cross-sectional side-view layout of a pressure sensor device 100, according to an example implementation of the disclosed technology. The device 100 may utilize a specifically designed sensor chip 102 that utilizes an insulator such as contact glass 104. The sensor chip 102 may be oriented so that sensing network 105 on the back side 106 of the sensor chip 102 is exposed to the measurement environment. In accordance with certain exemplary implementations of the disclosed technology, the sensor chip 102 may be a piezoresistive silicon-on-insulator (SOI) sensor chip.

The body of the device 100 can include a header shell 108 having a lip rim 110 that may be used to indirectly support the sensor chip 102 and/or electrical pins 114. In certain exemplary implementations, the header shell 108 can include (or be attached via a weld 128 to) the bottom portion 112 in which the electrical pins 114 may be fed through openings of the bottom portion 112 and sealed to the bottom portion 112 using electrically insulated pin feedthroughs 116, such as glassing and/or pin inserts as discussed in U.S. Pat. No. 10,436,662, which is incorporated herein by reference.

In accordance with certain exemplary implementations of the disclosed technology, the header shell 108, the lip rim 110, and/or the bottom portion 112 may be made of stainless steel or any other noncorrosive material (such as Inconel) that is suitable for being submerged in water. In certain implementations, at least the header shell 108 and the lip rim 110 may be machined from the same piece of material. In certain embodiments, the bottom portion 112 may be attached and sealed to the header shell 108 with a weld 128 after installing the sensor chip 102, spacer 118, electrical pins 114, and ceramic pedestal 124, for example, and after the wire interconnects 126 have been attached from the wire bond pads 122 to the sensing network 105.

As briefly described above, the sensor chip 102 may be specifically designed and fabricated to be mounted upside down so that the piezoresistive sensing network 105 can be exposed to the measurement media, while introducing the largest possible active diaphragm area for increased sensitivity suitable for low-pressure (microphone) measurements. To alleviate certain thermal mismatches that could be catastrophic in the low pressure measuring applications, the spacer 118 may be made from material that is thermally matched to the sensor chip 102, and the spacer 118 may be disposed between the sensor chip 102 and the lip rim 110. The thermally matched spacer 102 may be fabricated from insulating materials such as borosilicate glasses, etc., having a coefficient of thermal expansion (CTE) that is closely matched to the contact glass 104 located on the surface of the sensor chip 102. In accordance with certain exemplary implementations of the disclosed technology, the contact glass may be selected or configured to have a thickness in a range of about 0.020 inches (20 mils) to about 0.050 inches (50 mils). In accordance with certain exemplary implementations of the disclosed technology, the spacer 118 may be selected or configured to have a thickness in a range of about 0.020 inches (20 mils) to about 0.100 inches (100 mils).

In accordance with certain exemplary implementations of the disclosed technology, the CTE-matched spacer 118 may be mounted onto the lip rim 110 using a water-resistant adhesive (such as Viton) to form a seal 120 between the lip rim 110 and the spacer 118. The sensor chip 102 may then be mounted to the spacer 118 using the water-resistant adhesive to form a seal 120 between the spacer 118 and the glass 104 portion of the sensor chip 102.

In accordance with certain exemplary implementations of the disclosed technology, the adhesive material used to make the seals 120 may result in waterproof flexible seals 120 that have a low Young's modulus (for example, characterized by a value between 2 and 30 MPa) to minimize any stress that is transmitted to the spacer 118. Any residual stress that is transmitted may be absorbed by the seals 120 and/or the spacer 118.

As depicted in FIG. 1, the electrical pins 114 of the device 100 may be electrically connected to corresponding wire bond pads 122 on electrically non-conductive ceramic pedestals 124 and physically secured the corresponding ceramic pedestals 124. The ceramic pedestals 124 may be secured to the bottom portion of the lip rim 110. Accordingly, wire interconnects 126 may be bonded on one end to the wire bond pads 122 (and thus, electrically connected to the electrical pin 114) and bonded on the other end to corresponding pads of the sensing network 105 of the sensor chip 102.

In certain exemplary implementations, particularly for low-frequency applications, or applications in which debris may be present in the measurement media, an (optional) screen 128 may be disposed over the sensor chip 102 and attached to the header shell 108. However, for high-frequency applications or underwater applications in which air could be trapped, it may be desirable to omit the screen 128.

Figure 2:
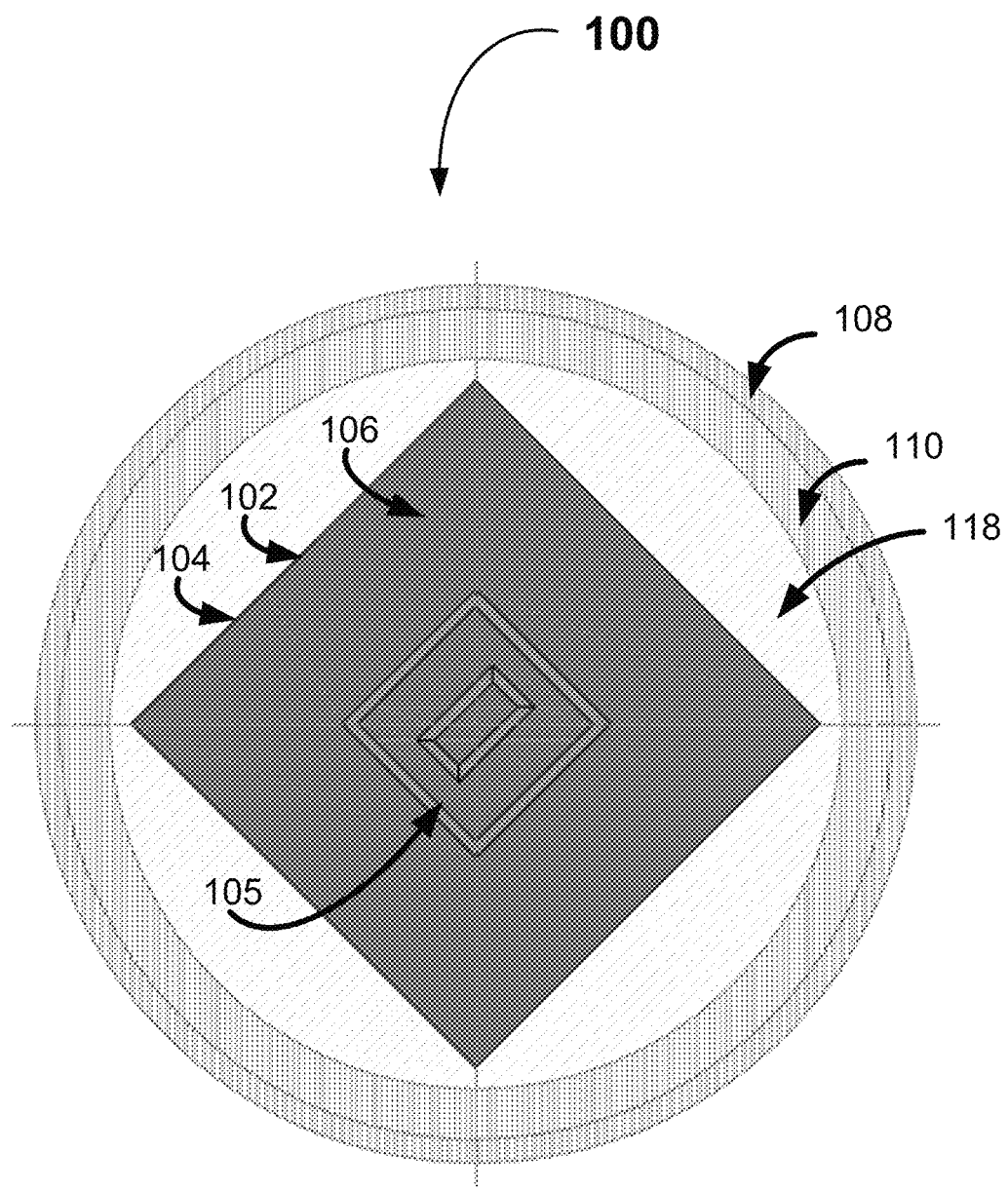
FIG. 2 depicts a top-down view of the pressure sensor device depicted in FIG. 1, including a sensor chip with the exposed sensor chip portions and housing, according to an example implementation of the disclosed technology.

FIG. 2 depicts a top-down view of the pressure sensor device 100 depicted in FIG. 1, including the portions of the device 100 that may be exposed to the measurement media, which may include the header shell 108, a portion of the lip rim 110, a portion of the spacer 118.

Figure 3:
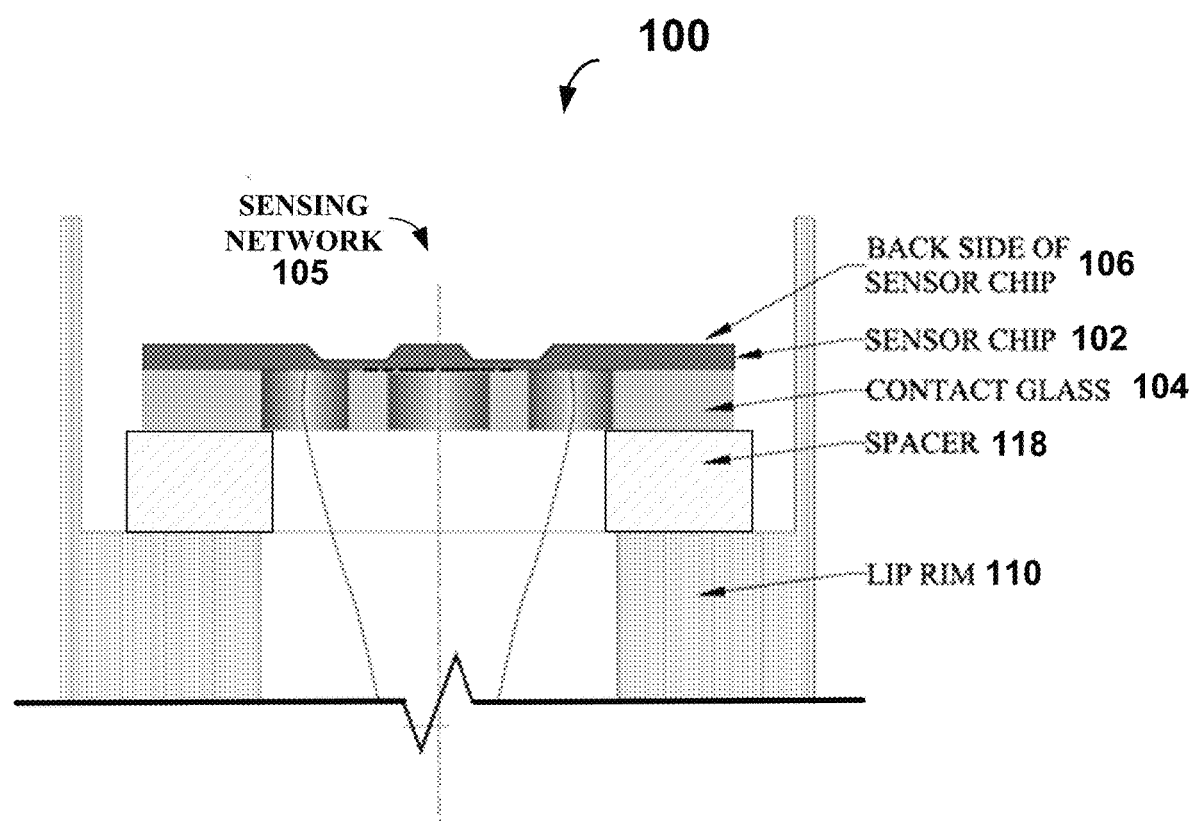
FIG. 3 depicts an upper portion of a pressure sensor device, according to an example implementation of the disclosed technology.

FIG. 3 depicts the upper portion of the pressure sensor device 100 to further illustrate portions of the device 100 that may be exposed to the measurement media, which (as illustrated in FIG. 2) can include the back side 106 of the sensor chip 102 including sensing network 105. In certain exemplary implementations, a portion of the contact glass 104 of the sensor chip 102 may also be exposed to the measurement media.

Figure 4:
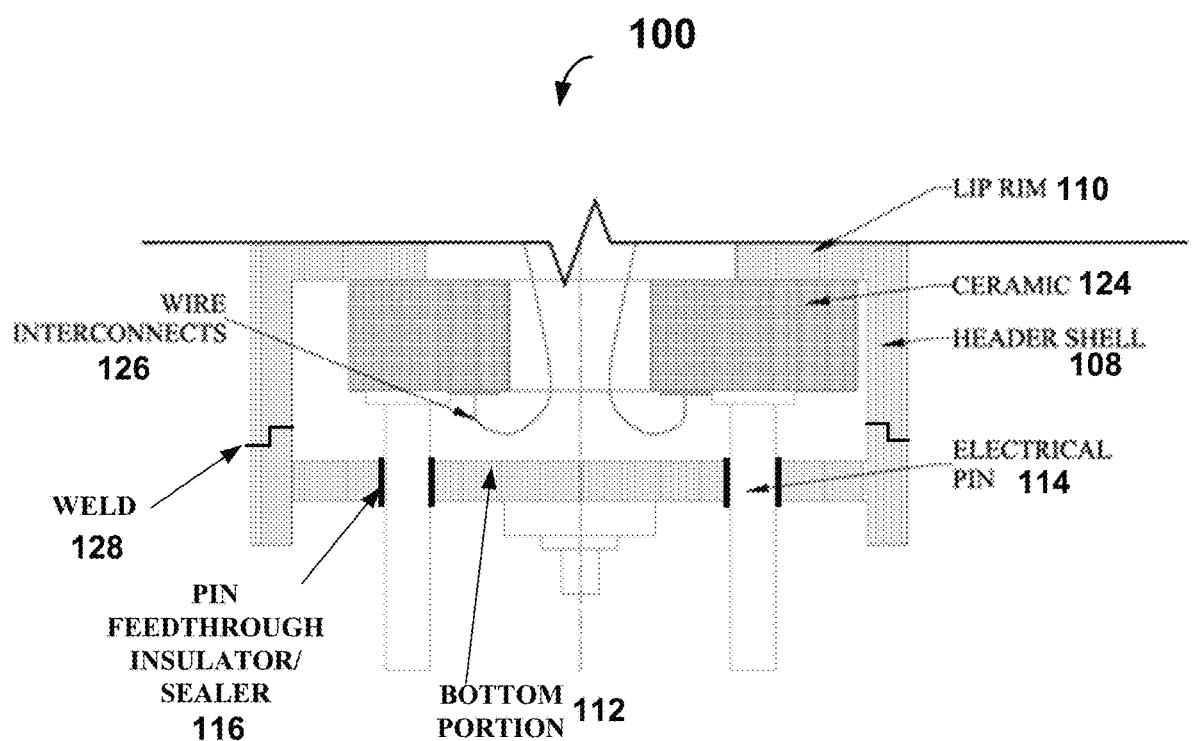
FIG. 4 depicts a lower portion of a pressure sensor device, according to an example implementation of the disclosed technology.

FIG. 4 depicts a lower portion of a pressure sensor device 100 to further illustrate the internal components portions of the device 100 that may be isolated from and protected from the external environment and measurement media. Once the device 100 is assembled and all of the wire interconnections 126 are completed, the entire lower portion of the device 100 may is hermetically sealed so that the internal wire interconnects 126, wire bond pads 122, ceramic pedestals 124, and internal portions of the electrical pins 114 may be protected from the external environment and measurement media.

The disclosed technology may enable the manufacturing of pressure sensor devices that have improved reliability in underwater, high-humidity, or otherwise potentially corrosive environments. Furthermore, the disclosed technology may be used to produce large diaphragm pressure sensor devices that have an overall small size and excellent response performance characteristics that may be used in applications that require a range of pressure measurements up to several hundred PSIs and/or for certain underwater applications.

Figure 5:
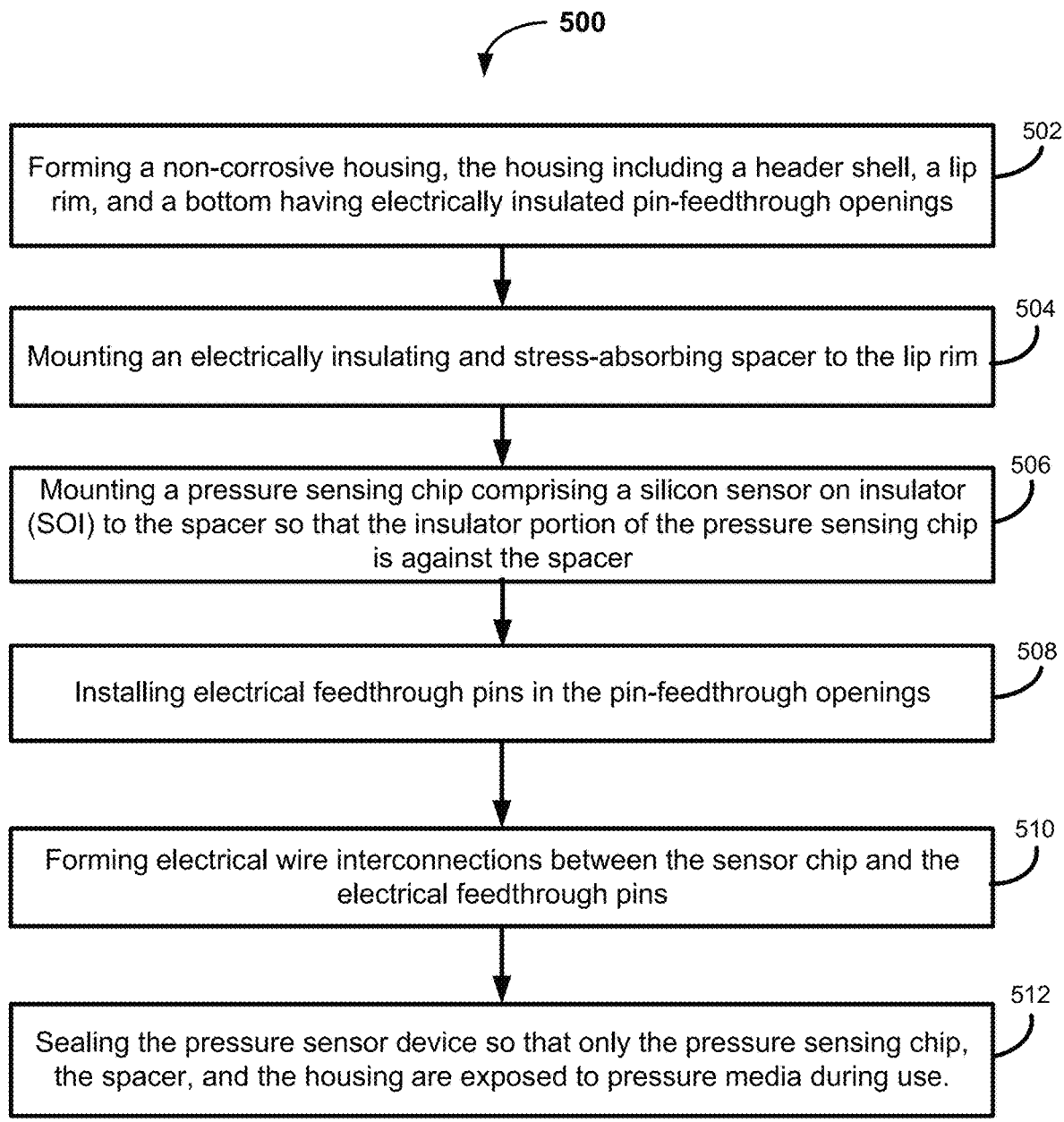
FIG. 5 is a flow diagram of a method of assembling a pressure sensor device, according to an example implementation of the disclosed technology.

FIG. 5 is a flow diagram of a method 500 of assembling a pressure sensor device, according to an example implementation of the disclosed technology. In block 502, the method 500 can include forming a non-corrosive housing including a header shell, a lip rim, and a bottom having electrically insulated pin-feedthrough openings. In block 504, the method 500 can include mounting an electrically insulating and stress-absorbing spacer to the lip rim. In block 506, the method 500 can include mounting a pressure sensing chip comprising a silicon sensor on insulator (SOI) to the spacer so that the insulator portion of the pressure sensing chip is against the spacer. In block 508, the method 500 can include installing electrical feedthrough pins in the pin-feedthrough openings. In block 510, the method 500 can include forming electrical wire interconnections between the sensor chip and the electrical feedthrough pins. In block 512, the method 500 can include sealing the pressure sensor device so that only the pressure sensing chip, the spacer, and the housing are exposed to pressure media during use.

In certain exemplary implementations, the method 500 of assembling the pressure sensor device may have alternative steps, or steps that are in a different order than depicted in FIG. 5. For example, in certain implementations, the bottom portion 112 may be a separate piece for which the electrical pins 114 may be inserted through the pin feedthroughs 116 and then the bottom portion 112 may be attached to the header shell 108 using welds 128, glassing, or adhesive. Thereafter, insulator seals at the interface of the electrical pins 114 and respective openings in the bottom portion 112 may be electrically isolated from, but sealed to the electrical pins, for example, to hermetically seal the bottom of the device. In certain implementations, the bottom portion 112 may be made of glass or other non-electrically conducting material so that it that may be secured to the header shell 108 and electrical pins 114 and sealed without further electrical isolation features.

In certain exemplary implementations, mounting the electrically insulating and stress-absorbing spacer to the lip rim can include forming an adhesive seal therebetween using a water-resistant adhesive.

In certain exemplary implementations, mounting the pressure chip to the spacer can include forming an adhesive seal therebetween using a water-resistant adhesive.

In certain exemplary implementations, one or more of mounting the spacer to the lip rim and mounting the pressure sensing chip to the spacer can include forming an adhesive seal using Viton.

In certain exemplary implementations, the non-corrosive housing is made of stainless steel.

In certain exemplary implementations, the insulator portion of the pressure chip comprises glass.

In accordance with certain exemplary implementations of the disclosed technology, the spacer coefficient of thermal expansion (CTE) may be matched to one or more of the insulators and the silicon of the pressure-sensing chip.

Certain exemplary implementations of the disclosed technology can include mounting a screen to a portion of the housing and over the pressure-sensing chip.

In certain exemplary implementations, the sensor chip may be mounted upside down, for example, to produce a large active diaphragm.

As disclosed herein and illustrated, wire-bonded pressure sensors and associated packaging with all of the metal contacts and electrical interconnections may be contained and sealed within the device to protect such components from corrosion, but with non-corrosive portions or regions of the sensor chip and housing exposed to the measurement environment.

Certain example implementations described herein may be utilized to address the need for enhancing the reliability of pressure sensor devices, particularly for use in high humidity and/or corrosive environments. Certain example implementations provide one or more protective enclosures to isolate wire bonds, contact pads, and/or sensor chips from an external environment. Furthermore, in certain example implementations, the enclosure(s) may include an inert environment to further prevent or reduce degradation of the associated enclosed internal components.

In accordance with an example implementation of the disclosed technology, the wire interconnections 126 and electrical pins 114 may be isolated from the header shell 108 and/or from the bottom portion 112 by combined seals and electrical isolators 116. In an example implementation, the wire bond pads 122 may be physically secured to the ceramic 124, but electrically isolated/separated from the header shell 108 due to the electrically isolating properties of the ceramic 124. In an example implementation, such electrical isolators may be utilized as needed to prevent unwanted electrical contact or communication between the electrical interconnection components and certain portions of the sensor device 100 packaging.

In an example implementation, components such as the electrical pins 114 and/or the header shell 108 can be made from one or more of Kovar, stainless steel, Inconel, nickel, tungsten, molybdenum, platinum, or from other metal or metal alloy. In certain example implementations, the electrical pins 114 may have a plated or deposited metal layer of gold, platinum, or other suitable metal or metal alloy.

In certain example implementations, the electrical pins 114 may be made from one or more of Kovar, stainless steel, Inconel, nickel, tungsten, molybdenum, platinum, or from other high-temperature metal or metal alloy and could have a plated or deposited metal layer of gold or platinum, or other suitable metal or metal alloy.

According to an example implementation of the disclosed technology, the wire interconnects 126 may be made between contact pads of the sensing network 105 and the corresponding wire bond pads 122 by one or more of wire bonding, welding, or other appropriate technique for joining metal wires to contacts. According to an example implementation of the disclosed technology, the wire interconnects 126 may include wires made of one or more of gold, platinum, aluminum, nickel, copper, or other suitable metal or metal alloy.

In accordance with an example implementation of the disclosed technology any or all of the components of the device 100 may be joined and sealed in an inert environment, preferably by electron beam welding, brazing, or other appropriate joining technique.

In accordance with certain example implementations of the disclosed technology, certain manufacturing steps may be carried out in an inert environment, such as in a chamber flooded with an inert gas such as nitrogen, helium, or argon. In certain example embodiments, the inert environment may help eliminate the formation of oxides or other unwanted materials during the welding and/or sealing processes. In certain example implementations, by sealing the various enclosures in the inert environment, corrosive or reactive gasses in the internal portion(s) of the sensor device may be reduced or eliminated. In this respect, the reliability and/or lifetime of the device may be enhanced or extended.

In certain example implementations an inert gas substantially devoid of other materials may flow into a processing chamber, oven, or another assembly cavity to displace oxygen. The presence of inert gas may provide an oxygen-free environment to shield the associated components of the sensor device parts, for example, to inhibit the formation of oxides during the sealing process and/or to displace oxygen from the internal enclosure of the sensor device before it is welded and/or sealed. In some implementations, the assembly and/or sealing of the sensor device in the inert environment may allow the formation of welds or seals between component parts without the use of fluxes and/or mechanical scrubbing, while the inert gas-rich environment may further prevent the formation of additional oxides on the welds, seals, or adhesives.

It is important to recognize that it is impractical to describe every conceivable combination of components or methodologies for the purposes of describing the claimed subject matter. However, a person having ordinary skill in the art will recognize that many further combinations and permutations of the subject technology are possible. Accordingly, the claimed subject matter is intended to cover all such alterations, modifications, and variations that are within the spirit and scope of the claimed subject matter.

Throughout the specification and the claims, the following terms take at least the meanings explicitly associated herein, unless the context clearly dictates otherwise. The term "connect," "connecting," and "connected" means that one function, feature, structure, or characteristic is directly joined to or in communication with another function, feature, structure, or characteristic. The term "couple," "coupling," and "coupled" mean that one function, feature, structure, or characteristic is directly or indirectly joined to or in communication with another function, feature, structure, or characteristic. Relational terms such as "first" and "second," and the like may be used solely to distinguish one entity or action from another entity or action without necessarily requiring or implying any actual relationship or order between such entities or actions. The term "or" is intended to mean an inclusive "or." Further, the terms "a," "an," and "the" are intended to mean one or more unless specified otherwise or clear from the context to be directed to a singular form. The term "include", and its various forms are intended to mean including but not limited to. The terms "substantially," "essentially," "approximately," "about" or any other version thereof, are defined as being close to as understood by one of ordinary skill in the art, and in one non-limiting embodiment, the term is defined to be within 10%, in another embodiment within 5%, in another embodiment within 1% and in another embodiment within 0.5%. A device or structure that is "configured" in a certain way is configured in at least that way but may also be configured in ways that are not listed.

As disclosed herein, numerous specific details are set forth. However, it is to be understood that embodiments of the disclosed technology may be practiced without these specific details. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may.

Although this disclosure describes specific examples, embodiments, and the like, certain modifications and changes may be made without departing from the scope of the disclosed technology, as set forth in the claims below. For example, although the example methods, devices, and systems, described herein are in conjunction with a pressure transducer or a sensor, the skilled artisan will readily recognize that the example methods, devices, or systems may be used in other methods, devices or systems and may be configured to correspond to such other example methods, devices or systems as needed. Further, while at least one example, embodiment, or the like has been presented in the detailed description, many variations exist. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments or examples are not intended to be construed as a critical, required, or essential feature or element of any or all of the claims. Numerous characteristics and advantages have been outlined in the foregoing description, together with details of structure and function. While the disclosed technology has been disclosed in several forms, it will be apparent to those skilled in the art that many modifications, additions, and deletions, especially in matters of shape, size, and arrangement of parts, can be made therein without departing from the spirit and scope of the disclosed technology and its equivalents as outlined in the following claims. Therefore, other modifications or embodiments as may be suggested by the teachings herein are particularly reserved as they fall within the breadth and scope of the claims here appended.

We claim:
1. A pressure sensor device, comprising:
a non-corrosive housing;
a sensor chip comprising silicon and contact glass, the sensor chip configured for low-pressure measurements;
an electrically insulating and stress-absorbing spacer layer disposed between the non-corrosive housing and the contact glass of the sensor chip;
at least two electrical feedthrough pins;
electrical interconnections disposed between the sensor chip and the electrical feedthrough pins;
wherein a back end of the pressure sensor device is hermetically sealed; and wherein only a backside of the sensor chip, the spacer layer, and the housing is exposed to pressure media during use.

2. The pressure sensor device of claim 1, wherein the housing is made of stainless steel.

3. The pressure sensor device of claim 1, wherein the sensor chip comprises piezoresistive SOI silicon.

4. The pressure sensor device of claim 3, wherein the sensor chip is mounted upside down.

5. The pressure sensor device of claim 1, wherein the spacer layer is matched to a coefficient of thermal expansion (CTE) of one or more of the glass and the silicon of the sensor chip.

6. The pressure sensor device of claim 1, wherein the spacer layer is mounted to a rim of the housing using a water-resistant adhesive.

7. The pressure sensor device of claim 6, wherein the spacer layer is mounted to the sensor chip using the water-resistant adhesive.

8. The pressure sensor device of claim 7, wherein the water-resistant adhesive comprises Viton.

9. The pressure sensor device of claim 7, wherein the water-resistant adhesive is characterized by a low Young's modulus having a value between 3 and 20 MPa.

10. The pressure sensor device of claim 1, wherein the non-corrosive housing is configured for submersion in water or use in high-humidity environments.

11. The pressure sensor device of claim 1, wherein the spacer layer comprises borosilicate glass.

12. The pressure sensor device of claim 1, further comprising a screen disposed over the sensor chip and secured to a portion of the housing.

13. A method of assembling a pressure sensor device, the method comprising:
forming a non-corrosive housing, the housing comprising a header shell, a lip rim, and a bottom having electrically insulated pin-feedthrough openings;
mounting an electrically insulating and stress-absorbing spacer to the lip rim;
mounting a pressure sensing chip comprising a silicon sensor on insulator (SOI) to the spacer so that the insulator of the pressure sensing chip is against the spacer;
installing electrical feedthrough pins in the pin-feedthrough openings;
forming electrical wire interconnections between the pressure sensing chip and the electrical feedthrough pins; and
sealing the pressure sensor device so that only the pressure sensing chip, the spacer, and the housing are exposed to pressure media during use.

14. The method of claim 13, wherein mounting the electrically insulating and stress-absorbing spacer to the lip rim comprises forming an adhesive seal therebetween using a water-resistant adhesive.

15. The method of claim 13, wherein mounting the pressure sensing chip to the spacer comprises forming an adhesive seal therebetween using a water-resistant adhesive.

16. The method of claim 13, wherein one or more of mounting the spacer to the lip rim and mounting the pressure sensing chip to the spacer comprises forming an adhesive seal using Viton.

17. The method of claim 13, wherein the non-corrosive housing is made of stainless steel.

18. The method of claim 13, wherein the insulator of the pressure sensing chip comprises glass.

19. The method of claim 13, wherein the spacer is matched to a coefficient of thermal expansion (CTE) of one or more of the insulators and the silicon of the pressure sensing chip.

20. The method of claim 13, further comprising mounting a screen to a portion of the housing and over the pressure sensing chip.

* * * * *